J. WILSON.
Wheel Cultivator.

No. 67,093.

Patented July 23, 1867.

Witnesses:
Theo Tusche
W. Trewin

Inventor:
J. Wilson
per Munn & Co
atty

United States Patent Office.

JACOB WILSON, OF SOMERFORD, OHIO.

Letters Patent No. 67,093, dated July 23, 1867.

IMPROVEMENT IN CULTIVATORS.

*The Schedule referred to in these Letters Patent and making part of the same.*

TO ALL WHOM IT MAY CONCERN:

Be it known that I, JACOB WILSON, of Somerford, in the county of Madison, and State of Ohio, have invented a new and improved Cultivator, and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

This invention relates to a new and improved two-horse cultivator for cultivating those crops which are grown in hills or drills, such as corn, cotton, etc.

The invention consists in a novel and improved construction of the parts, as hereinafter fully shown and described, whereby the rider or operator has full control over the ploughs, being enabled to raise and lower and move the same laterally with the greatest facility, and the draught mechanism also improved and rendered more favorable for the horses than hitherto. In the accompanying sheet of drawings—

Figure 1:
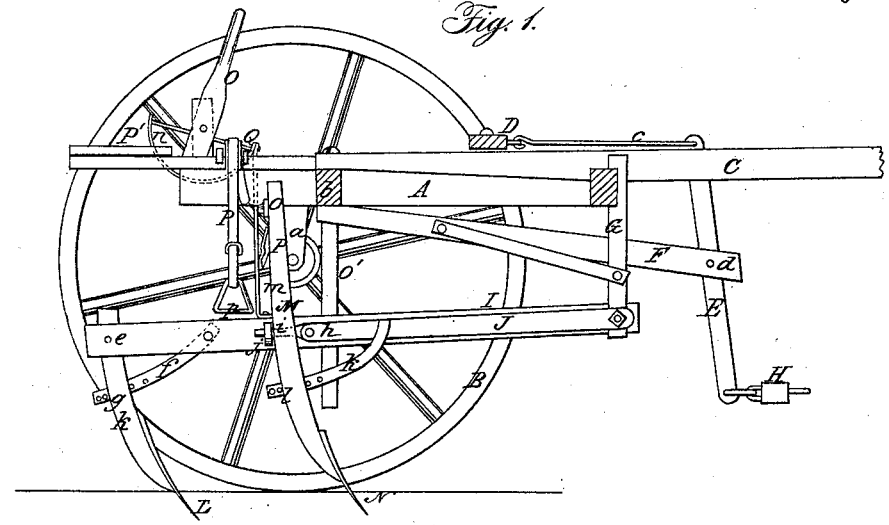
Figure 2:
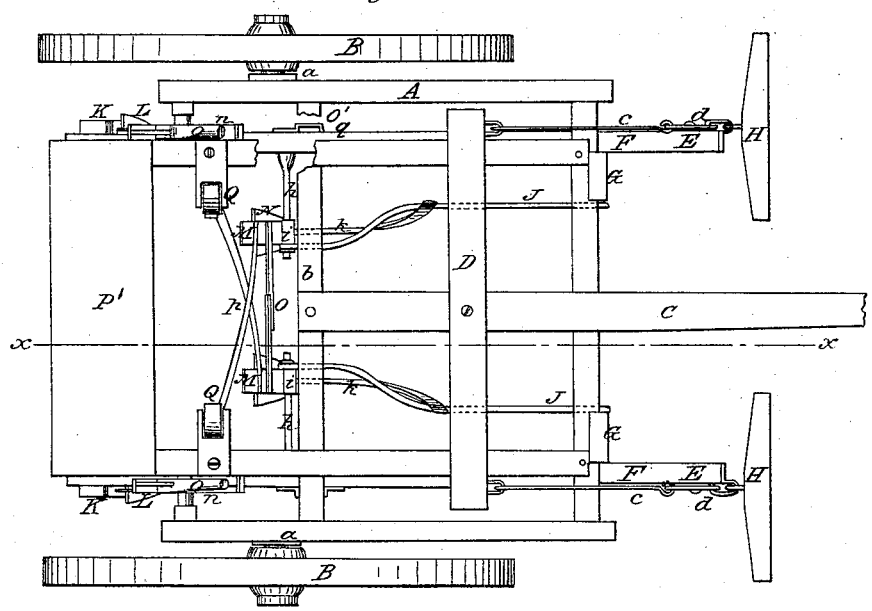

Figure 1 is a side sectional view of my invention, taken in the line $x$ $x$, fig. 2.

Figure 2, a plan or top view of the same.

Figure 3:
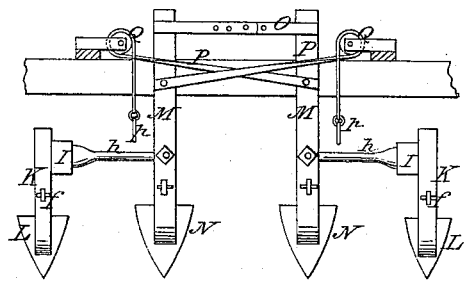

Figure 3, a detached rear view of the shovels or ploughs pertaining to the same.

Similar letters of reference indicate like parts.

A represents the frame of the machine, which is mounted on two wheels B B, the axles of which are secured to pendent bars $a$ $a$, attached to the frame. C is the draught-pole, the rear end of which is attached to a cross-bar, $b$, near the centre of the frame, and D is a double-tree, which is secured upon the rear part of the draught-pole, and has its ends connected by rods $c$ to the upper ends of levers E E, which are attached by central fulcrum-pins $d$ to the front ends of bars F, which are firmly bolted to pendants G G at the front part of the frame A, and to the cross-bar $b$. To the lower ends of the levers E E the whiffle-trees H are attached. By this means a low-draught attachment is obtained for each draught animal, and the double-tree placed in an elevated position, that is, on the top of frame A, out of the way of the growing plants; it being understood that a horse walks at each side of the row of plants being operated upon. I J represent plough-beams, there being two at each side of the machine. These plough-beams at their front ends are secured by bolts to the pendants G G, and are allowed to work freely on the bolts. The beams I are longer than the beams J, and the former have standards, K, attached by a pivot-bolt, $e$, segment guides $f$, which are pivoted to the beams I, passing through the standards K, said guides being perforated, and each having a wooden pin, $g$, passing through one of the perforations at the rear of the standards, to hold the standards K in position, a shovel or plough L being secured to the lower end of each of said standards. The shorter plough-beams J, which are of iron, are connected by cross-arms $h$ to the beams I, and a standard, M, is secured to each cross-arm by a bolt, $i$, the latter being fitted on the cross-arms by an eye through which the latter pass, and the standards being secured on the bolts $i$ by nuts $j$, (see fig. 1.) The standards M are braced from the beams J by curved bars $k$, the rear ends of which pass through the standards, and the latter secured on them by wooden pins $l$ in the same way as the standards K are held on the guides $f$; the front ends of the bars $k$ being curved over journals on the beams J, so that they may turn thereon. The standards M have ploughs or shovels N attached to their lower ends, and the ploughs are raised and lowered by means of straps or chains $m$, which are attached to the beams I and to semicircular bars $n$ attached to levers $o$ at each side of the rear of frame A. The upper ends of the standards M M are connected by a cross-bar, O, and each standard has a strap, P, attached, said straps passing over pulleys Q Q, one at each side of the frame A, each strap having a stirrup, $p$, at its end, to receive the feet of the driver. The driver, it will be seen, by means of his feet can move the ploughs or shovels N laterally with the greatest facility, so that they may conform to the sinuosities of the rows of plants. The plough-beams I J are prevented from having any unnecessary play by having pendent guides O', which are attached to the frame A, and pass through loops $q$ at the sides of the beams I. The driver's seat P' is on the rear of the frame A.

Having thus described my invention, I claim as new, and desire to secure by Letters Patent—

1. The combination and arrangement of the double-tree D, rods $c$, levers E, whiffle-trees H with the frame A, mounted on wheels, substantially in the manner as and for the purpose set forth.

2. The two plough-beams I J, connected together by the cross-arms $h$, and connected at their front ends by bolts to the pendants G G, with the pendent guides O', passing through loops $q$ at the outer sides of the beams I, substantially as and for the purpose specified.

3. The attaching of the plough-standards M M to the cross-arms $h$ of the plough-beams I J by means of the swivel-bolts $i$, in connection with the straps P, passing over fixed pulleys Q and stirrups $p$, all arranged to operate in the manner as and for the purpose specified.

4. The raising and lowering of the plough-beams I J through the medium of the levers $o$, semicircular bars $n$, and straps $m$, arranged substantially as shown and described.

JACOB WILSON.

Witnesses:
H. C. SPOUGH,
T. F. PRUGH.